(12) United States Patent
Bai et al.

(10) Patent No.: US 10,944,640 B2
(45) Date of Patent: Mar. 9, 2021

(54) GENERATING AND IMPLEMENTING A PLATFORM-NEUTRAL CLOUD-NATIVE APPLICATION MODEL

(71) Applicant: Microsoft Technology Licensing, LLC, Redmond, WA (US)

(72) Inventors: Haishi Bai, Carnation, WA (US); Mark Eugene Russinovich, Bellevue, WA (US); Boris Markus Scholl, Kirkland, WA (US); Yaron Schneider, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 142 days.

(21) Appl. No.: 16/186,167

(22) Filed: Nov. 9, 2018

(65) Prior Publication Data
US 2020/0153699 A1 May 14, 2020

(51) Int. Cl.
*H04L 12/24* (2006.01)
*H04L 12/911* (2013.01)
*H04L 29/08* (2006.01)

(52) U.S. Cl.
CPC ............ *H04L 41/145* (2013.01); *H04L 47/70* (2013.01); *H04L 67/10* (2013.01)

(58) Field of Classification Search
None
See application file for complete search history.

(56) References Cited

U.S. PATENT DOCUMENTS

| 7,926,070 | B2* | 4/2011 | Sedukhin | G06F 8/35 |
| | | | | 719/321 |
| 9,606,794 | B1 | 3/2017 | Chou et al. | |
| 10,686,766 | B2 | 6/2020 | Jahner et al. | |

(Continued)

FOREIGN PATENT DOCUMENTS

EP 3128418 A1 2/2017

OTHER PUBLICATIONS

Breitenbucher, et al., "Combining Declarative and Imperative Cloud Application Provisioning based on TOSCA", In Proceedings of the IEEE International Conference on Cloud Engineering, Mar. 11, 2014, pp. 87-96.

(Continued)

*Primary Examiner* — Backhean Tiv
(74) *Attorney, Agent, or Firm* — Ray Quinney & Nebeker P.C.; James Bullough

(57) ABSTRACT

The present disclosure relates to systems, methods, and computer-readable media for generating a platform-neutral application model that provides a complete and accurate representation of functionality and topology for a cloud-native application. For example, systems disclosed herein analyze application data to identify platform neutral application features including resources, mesh connections, and quality of service (QoS) constraints associated with implementing a cloud-native application via a cloud computing system. The systems disclosed herein further construct a platform-neutral application model including identifiers of the application features. The platform-neutral application model facilitates convenient translation of applications between different platforms and further streamlines development and deployment of cloud-native applications across any number of platforms.

20 Claims, 7 Drawing Sheets

(56) References Cited

U.S. PATENT DOCUMENTS

| | | | | |
|---|---|---|---|---|
| 2002/0099669 A1* | 7/2002 | Lauer | H04L 41/5003 | 705/80 |
| 2005/0050525 A1* | 3/2005 | Chittar | G06F 8/51 | 717/136 |
| 2012/0158925 A1* | 6/2012 | Shen | G06F 9/5011 | 709/221 |
| 2012/0159517 A1* | 6/2012 | Shen | G06F 8/61 | 719/318 |
| 2013/0007216 A1* | 1/2013 | Fries | G06F 9/4856 | 709/218 |
| 2014/0136954 A1* | 5/2014 | Ligman | G06F 40/14 | 715/234 |
| 2015/0066896 A1* | 3/2015 | Davis | G06F 16/9038 | 707/710 |
| 2015/0169306 A1* | 6/2015 | Labocki | G06F 9/45533 | 717/176 |
| 2016/0139938 A1* | 5/2016 | Dimitrakos | G06F 9/44505 | 718/100 |
| 2017/0060557 A1* | 3/2017 | Bendelac | G06F 8/61 | |
| 2017/0206245 A1* | 7/2017 | Zhang | G06F 9/4552 | |
| 2018/0039502 A1* | 2/2018 | Singh | G06F 40/263 | |
| 2020/0067818 A1* | 2/2020 | Jeuk | H04L 45/16 | |
| 2020/0151023 A1* | 5/2020 | Bai | H04L 67/34 | |
| 2020/0153699 A1* | 5/2020 | Bai | G06F 9/5072 | |

OTHER PUBLICATIONS

"International Search Report and Written Opinion Issued in PCT Application No. PCT/US19/059290", dated Jan. 7, 2020, 13 Pages.

"International Search Report and Written Opinion Issued in PCT Application No. PCT/US2019/059579", dated Jan. 8, 2020, 13 Pages.

"Non Final Office Action Issued in U.S. Appl. No. 16/189,972", dated Jun. 23, 2020, 12 Pages.

"Final Office Action issued in U.S. Appl. No. 16/189,972", dated Jan. 6, 2021, 11 Pages.

* cited by examiner

GENERATING AND IMPLEMENTING A PLATFORM-NEUTRAL CLOUD-NATIVE APPLICATION MODEL

CROSS-REFERENCE TO RELATED APPLICATIONS

N/A

BACKGROUND

A cloud computing system refers to a collection of computing devices and resources on which various applications may be implemented. For example, modern cloud computing infrastructures often include a collection of physical service devices organized in a hierarchical structure including computing zones, clusters, virtual local area networks (VLANs), racks, fault domains, etc. Indeed, a cloud computing system provides an environment of computing resources that provide the ability to scale applications and implement functionalities that would not be possible on traditional client devices (e.g., personal computers, mobile devices).

As cloud computing systems have grown in popularity and increased in complexity, cloud-native applications have similarly grown more complex and diverse. For example, different cloud computing environments have different hierarchies, architectures, and interconnectivities that are implemented differently across different platforms. In addition, cloud-native applications often have different formats depending on development tools and/or depending on the particular cloud computing environment on which a developer intends to deploy an application.

Traditionally, application developers independently design unique cloud-native applications for each platform and/or for each cloud on which the application is to be deployed. For example, in order to create or otherwise implement a cloud-native application to be launched on two different platforms (e.g., two different formats and/or two different cloud networks), an application developer generally designs two distinct applications having different platform-specific features and which are independently configured to operate via the two different platforms. As a result, adopting applications across different environments is often consuming and cost prohibitive. Moreover, few developers have the skill or experience needed to develop applications across a growing number of unique platforms.

DETAILED DESCRIPTION

Figure 1:
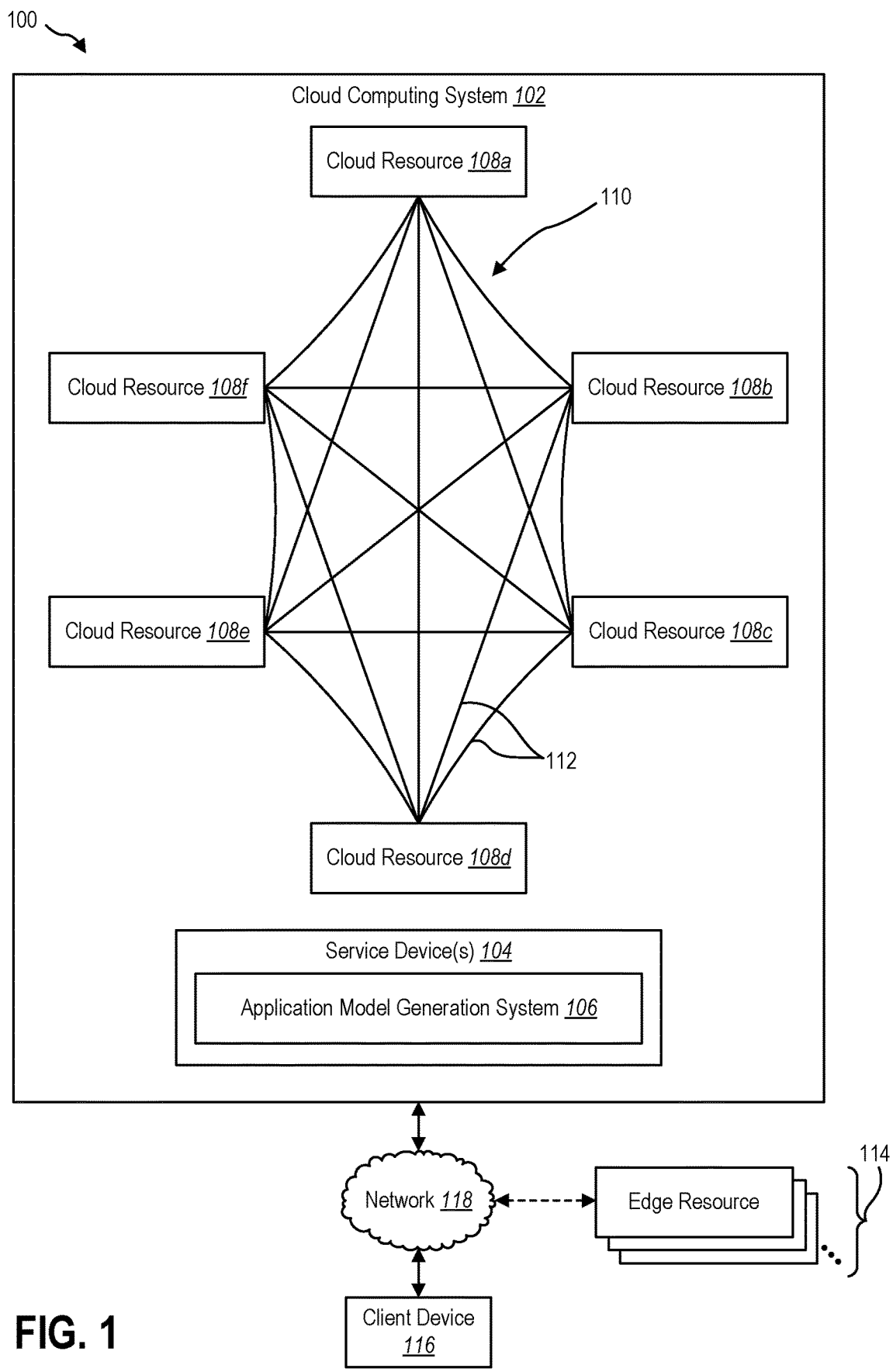
FIG. 1 illustrates an example environment of a cloud computing system including an application model generation system in accordance with one or more implementations.

The present disclosure generally relates to an application model generation system implemented in connection with a cloud computing system (e.g., a distributed network of computing resources) to generate an application model for use in implementing a cloud-native application (e.g., an application implemented at least partially on a cloud computing system) across a variety of cloud computing platforms. In particular, as will be described in further detail below, the application model generation system identifies application features for a cloud-native application that includes platform neutral features associated with functionality and topology of the cloud-native application. For example, the application model generation system identifies application features including cloud resources, mesh connections, and quality of service (QoS) constraints that provide a complete description of the functionality and topology of a cloud-native application. The application model generation system can further generate a platform-neutral application model that includes the identified application features for use in launching, further developing, or otherwise implementing a cloud-native application based on the platform-neutral application model.

Implementations of the present disclosure provide benefits and/or solve one or more problems associated with implementing cloud-native applications across a variety of cloud computing platforms. For example, by identifying platform neutral application features including resources and mesh connections, the application model generation system can generate an application model that is generic, powerful, and extensible to cloud-native applications (e.g., microservice applications) across a variety of cloud computing platforms. Indeed, by generating an application model that includes a complete description of functionality and topology, the application model generation system enables a developer to implement a cloud-native application across different, unique platforms based on a single application model without developing individual applications for each respective platform.

In addition to generating a platform-neutral application model that includes an accurate description of functionality and topology for a cloud-native application, the application model generation system also identifies and includes quality of service (QoS) constraints within the application model. Accordingly, the application model generation system enables developers to factor in non-functional requirements that may have significant impact in how an application is designed and/or implemented on a cloud computing system. This allows developers to further express scalability, reliability, availability, cost considerations and other platform-neutral operating constraints into the development of cloud-native applications based on the platform-neutral application model.

In addition to simply generating a platform-neutral application model, the application model generation system facilitates translation between cloud-native applications across different platforms. For example, as will be discussed in further detail herein, the application model generation system can implement a set of translation rules to extract data (e.g., metadata) from a platform-specific cloud-native application to generate a platform-neutral application model. The application model generation system can additionally utilize the platform-neutral application model to project or otherwise implement the platform-specific cloud-native application to a version of the cloud-native application configured to be implemented via a different platform. By utilizing the platform-neutral application model as an intermediate model between any number of platform-specific applications, the application model generation system facilitates projection between any number of different platforms without implementing a unique set of translation rules between each application platform and every other possible application platform.

As illustrated in the foregoing discussion, the present disclosure utilizes a variety of terms to describe features and advantages of the application model generation system. Additional detail is now provided regarding the meaning of such terms. For instance, as used herein, a "cloud computing system" refers to a network of connected devices and/or resources that provide various services to client devices. For instance, a cloud computing system can include a collection of physical server devices organized in a hierarchical structure including computing zones, clusters, virtual local area networks (VLANs), racks, fault domains, etc. Cloud computing systems can host and/or access a variety of resources that provide services invoked by cloud-native applications.

As used herein, a "cloud-native application" or simply "application" refers to a program, file, or code that includes instructions for performing one or more functions or tasks using resources of a cloud computing system. In particular, a cloud-native application may refer to a software program, a file, or portion of code configured to invoke or otherwise access one or more resources (e.g., services) provided by a cloud computing system. As will be discussed in further detail below, cloud-native applications may refer specifically to platform-specific cloud-native applications.

As used herein, a "platform-specific cloud-native application" refers to a cloud-native application that includes platform-specific instructions or features associated with implementing the cloud-native application on a corresponding platform. For example, a platform-specific cloud-native application may refer to a cloud-native application implemented or deployed by way of a specific platform. As used herein, a "platform" may refer to a particular application format (e.g., a packaging format), deployment mechanism or orchestrators for deploying or implementing the application, and/or an environment (e.g., a cloud architecture) on which the application is implemented. Thus, an application implemented via a corresponding platform may refer to a format, deployment mechanism, and/or environment on which the application is implemented.

As mentioned above, a cloud computing system can host or otherwise provide access to a number of resources. As used herein, a "resource" or "application resource" refers to any service (e.g., a microservice) provided by a cloud computing system that may be identified within instructions or code of a cloud-native application. Resources include, by way of example, microservices, databases, file folders, load balancers, storage spaces, proxies, or any other service or process registered on a cloud computing system that may be invoked or otherwise accessed using a cloud-native application. While one or more embodiments described herein specifically refer to cloud resources (e.g., resources located exclusively on the cloud), resources may additionally refer to edge resources or services provided by edge devices (e.g., devices not on the cloud).

As used herein, a "mesh connection" refers to any connection between application resources. For instance, a mesh connection may refer to any communication channel over which data is communicated between application resources. As an example, a mesh connection may refer to endpoints or ports of resources or service devices exposed by registering application resources on a cloud computing system. Mesh connections may include, by way of example, direct connections between resources or server devices, message queues, intermediate devices or routers that facilitate communication between different resources, messaging buses and reactive streams, or any other component of the cloud computing system that makes up the topology of a cloud-native application. As will be discussed in further detail herein, a topology of a cloud-native application refers to a collection of mesh connections that connect resources identified by the cloud-native application.

As used herein, an "operation constraint" or "quality of service (QoS) constraint" refers to operating conditions or considerations associated with performing a service or implementing a cloud-native application on a cloud computing system. For example, a quality of service (QoS) constraint can refer to a measurement or aspect of a service such as a measurement of availability of a service, a measurement of cost (e.g., a monthly cost) for accessing the service, a load-balance requirement, a restriction of deployment (e.g., a first service or resource cannot be deployed on the same server device as a second service or resource), an indicated preference (e.g., a user preference or setting) or any other quality of service (QoS) constraint(s) identified in conjunction with a cloud-native application. In one or more embodiments described herein, a quality of service (QoS) constraint is expressed as a tag (e.g., a keyword or term) associated with a resource and/or mesh connection that indicates an operating constraint that should be applied to the corresponding resource and/or mesh connection.

As will be discussed in further detail below, an application model generation system can generate a platform-neutral application model including a variety of features and characteristics. As used herein, a "platform-neutral application model" refers to a file, code, or other object that provides a platform-neutral description or representation of a cloud-native application. In particular, a platform-neutral application model includes an identification of resources and mesh connections descriptive of services and associated topology of a cloud-native application. In addition, the platform-neutral application model may include an identification of quality of service (QoS) constraints for the cloud-native application. Further detail in connection with generating and utilizing the platform-neutral application model will be described below.

Additional detail will now be provided regarding the application model generation system in relation to illustrative figures portraying example implementations. For example, FIG. 1 illustrates an example environment 100 for generating and implementing a platform-neutral application model. As shown in FIG. 1, the environment 100 includes a cloud computing system 102, which includes one or more server device(s) 104 including the application model generation system 106 implemented thereon.

As illustrated in FIG. 1, the cloud computing system 102 additionally includes cloud resources 108a-f, which may refer to a variety of types of resources and services provided by the cloud computing system 102. For instance, the cloud resources 108a-f may refer to microservices, databases, file folders, load balancers, or other services or processes registered on a cloud computing system. One or more of the cloud resources 108a-f may be implemented on the same or different server devices (e.g., server nodes). For example, a first and second cloud resource 108a-b may be implemented on a first server device (e.g., a server node) while a third cloud resource 108c is implemented on a second server node on the same or different grouping of server devices (e.g., the same or different cluster of server nodes).

The cloud computing system 102 may further include a mesh network 110 or other topology that includes any number of resource connections 112 that provide for communication between the various cloud resources 108a-f. As shown in FIG. 1, the mesh network 110 includes resource connections 112 made up of direct connections that facilitate communication directly between cloud resources 108a-f or server devices on which the cloud resources 108a-f are located. The mesh network 110 may include any type of resource connections that facilitate direct or indirect communication between the cloud resources 108a-f. For example, the resource connections 112 may include bridges, switches, routers, base stations, or other infrastructure devices that enable cloud resources 108a-f to communicate. In addition to infrastructure devices, the resource connections 112 may include services such as message queues, protocols, or other platforms over which the cloud resources 108a-f can communicate. While one or more embodiments described herein relate specifically to a mesh network topology, features described with regard to a network of connections between resources may similarly apply to other types of topologies used by various cloud computing systems.

As further shown in FIG. 1, the environment 100 may include a variety of edge resources 114. As used herein, an "edge resource" refers to one or more resources outside the framework of the cloud computing system 102. For example, an edge resource may refer to a service or function provided by an internet of things (IoT) device, a personal computer, a mobile device, a gateway, or other device outside the framework of the cloud computing system 102. In addition, while one or more embodiments described herein relate specifically to a cloud-native application implemented entirely on a cloud computing system 102 that exclusively utilizes resources hosted by the cloud computing system 102 (e.g., cloud resources 108a-f), a cloud-native application may similarly access one or more edge resources 114 in connection with one or more examples described herein.

The environment 100 further includes a client device 116 in communication with the cloud computing system 102 by way of a network 118. The client device 116 may communicate with any device of the cloud computing system 102 and one or more edge resources 114 via the network 118. The client device 116 may refer to a computing device of a customer for use in accessing or otherwise utilizing a cloud-native application. In addition, or as an alternative, the client device 116 may refer to a computing device of a developer for use in testing, developing, or otherwise implementing the cloud-native application on the cloud computing system 102.

The client device 116 may refer to various types of computing devices including, by way of example, mobile devices, desktop computers, or other types of computing devices. In addition, the network 118 may include one or multiple networks that use one or more communication protocols or technologies for transmitting data. For example, the network 118 may include the Internet or other data link that enables transport of electronic data between respective client devices and devices of the cloud computing system 102.

As shown in FIG. 1, the application model generation system 106 may be implemented in whole or in part on one or more server device(s) 104 that are part of the cloud computing system 102 including the cloud resources 108a-n and resource connections 112 that make up the mesh network 110. Alternatively, in one or more implementations, the application model generation system 106 may be implemented in whole or in part on a different system or network of devices. For example, the application model generation system 106 may be implemented wholly or partially on a client device, a third-party web server device, a different cloud computing system, or other computing device(s).

As will be discussed in further detail below, the application model generation system 106 may be implemented within the environment 100 to generate a platform-neutral application model that provides a complete description of functionality and topology of a cloud-native application. In addition, the application model generation system 106 facilitates creation of the platform-neutral application model in a variety of ways. For instance, as will be discussed in further detail below (e.g., in connection with FIGS. 3-4), the application model generation system 106 can facilitate generation of the platform-neutral application model by translating or projecting a platform-specific cloud-native application previously developed for an existing platform (e.g., a deployment platform and/or a different cloud computing architecture). As another example, and as will be discussed in further detail below (e.g., in connection with FIG. 5), the application model generation system 106 can facilitate creation of a new cloud-native application based on a platform-neutral application model created from scratch.

Figure 2:
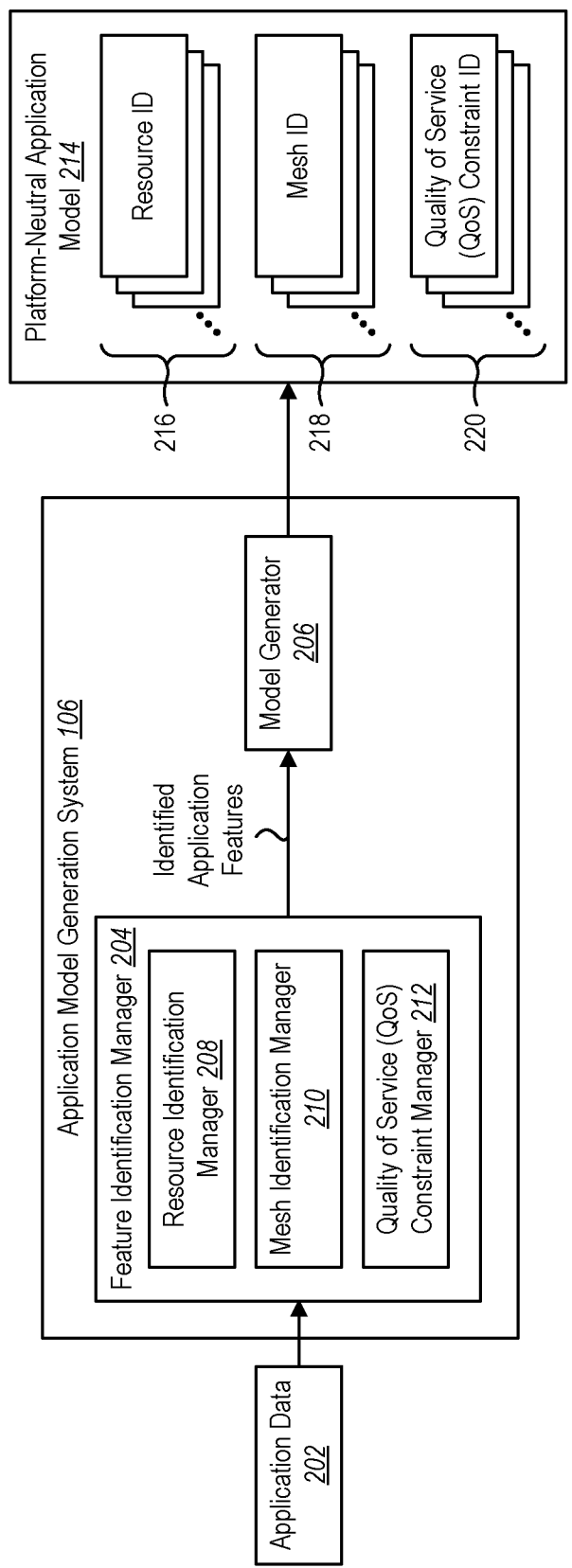
FIG. 2 illustrates an example framework for identifying application features and generating a platform-neutral application model in accordance with one or more implementations.

Additional detail with regard to generating a platform-neutral application model will now be described in connection with FIG. 2. In particular, the application model generation system 106 may include similar features as discussed above in connection with FIG. 1. As shown in FIG. 2, the application model generation system 106 includes a feature identification manager 204 and a model generator 206. The feature identification manager 204 further includes a resource identification manager 208, a mesh identification manager, and a quality of service (QoS) constraint manager 212. In accordance with the example shown in FIG. 1, each of the components 204-212 of the application model generation system 106 may be implemented on the server device(s) 104 of the cloud computing system 102. Alternatively, one or more of the components 204-212 may be implemented wholly or partially on one or more additional devices (e.g., a server device of another cloud computing system, a client device).

For example, while one or more embodiments described herein involve generating a platform-neutral application model using one or more server device(s) 104 of a cloud computing system 102 (as shown in FIG. 1), the application model generation system 106 may be implemented on a client device or as a modeling language applied on a computing device on or off the cloud computing system 102. For instance, in one or more implementations, the application model generation system 106 may include a modeling language that, when applied to a platform-specific cloud application file or manifest, facilitates identifying application features and generating the platform-neutral application model in accordance with various examples described herein. As used herein, a "manifest" refers to a file or document including metadata associated with implementing a cloud-native application. For instance, a manifest may include metadata associated with security and dependencies of an application and/or may include supplemental instructions for deploying or otherwise implementing the application under various operating conditions. A manifest may be embedded within an application file.

The components 204-212 of the application model generation system 106 can include software, hardware, or both. For example, the components 204-212 of the application model generation system 106 can include one or more instructions stored on a computer-readable storage medium and executable by processors of one or more computing devices (e.g., server device(s)). When executed by the one or more processors, the computer-executable instructions of the application model generation system 106 can cause the server device(s) 104 to perform one or more methods or series of acts described herein (e.g., in connection with FIGS. 3, 5, and 6 described below). Alternatively, the components 204-212 of the application model generation system 106 can comprise hardware, such as a special purpose processing device to perform a certain function or group of functions. Additionally, or alternatively, the components 204-212 of the application model generation system 106 can include a combination of computer-executable instructions and hardware.

As shown in FIG. 2, the application model generation system 106 may receive application data 202 including data associated with a cloud-native application. The application data 202 may include information about a software application yet to be created or deployed (e.g., based on a platform-neutral application model). Accordingly, in one or more embodiments, the application data 202 includes data obtained from instructions for developing or otherwise creating a new cloud-native application. Alternatively, the application data 202 may include data from a previously developed cloud-native application deployed on or otherwise associated with an existing platform. For example, the application data 202 may include data from an application file for a previously developed or generated platform-specific cloud-native application.

Upon receiving the application data 202, the feature identification manager 204 can identify any number of application features associated with implementing a cloud-native application corresponding to the application data 202 on the cloud computing system 102. In particular, the feature identification manager 204 can analyze the application data 202 (e.g., including application metadata) and identify application features that provide a representation or description of the cloud-native application as it would be deployed across a number of different platforms. In one or more embodiments, the feature identification manager 204 identifies platform-neutral features including application features that are not unique to a corresponding platform. Rather, the feature identification manager 204 can identify application features that are platform-neutral including only application features that apply to all (or at least multiple) platforms.

The feature identification manager 204 can identify the features in a variety of ways. For example, the feature identification manager 204 can apply a set of feature identification rules to the application data 202 to identify any number of application features. For instance, as will be discussed in further detail below in connection with FIGS. 3-4, the feature identification manager 204 can analyze a platform-specific cloud-native application (e.g., a previously developed cloud-native application) and extract application features from the metadata of the application including code or instructions that make up the cloud-native application. As another example, and as will be described in further detail below in connection with FIG. 5, the feature identification manager 204 can identify application features based on application creation instructions received from a client device of an application developer.

As mentioned above, application model generation system 106 can identify different types of application features. For example, as shown in FIG. 2, the feature identification manager 204 includes a resource identification manager 208 to identify application resources associated with functionalities invoked or otherwise referenced by the application data 202. Indeed, the feature identification manager 204 can identify all resources associated with the application data 202 to provide a full description or representation of application resources (e.g., including cloud resources and/or edge resources) that a cloud-native application based on the cloud data 202 would access in performing functionality of the application.

In one or more embodiments, the resource identification manager 208 identifies application resources exclusive to the cloud computing system 102 (e.g., cloud resources 108a-f). Moreover, the resource identification manager 208 may identify application resources exclusive to a particular group of server devices (e.g., a cluster of devices) or a region of devices on the cloud computing system 102. Alternatively, the resource identification manager 208 can identify resources across different groupings of devices, across different regions, and even across multiple cloud computing systems. In addition, the resource identification manager 208 can identify one or more edge resources 114 that provide access to additional functionality.

The feature identification manager 204 further includes a mesh identification manager 210. The mesh identification manager 210 can identify mesh characteristics associated with connections or paths of communication between the application resources (e.g., cloud resources 108a-f) identified by the resource identification manager 208. As indicated above, the mesh identifications may refer to direct connections between server devices, message queues, intermediate devices, routers or any combination of hardware and/or software that facilitates communication between the application resources. Indeed, the mesh identification manager 210 can identify any number of mesh connections to determine a topology of the cloud-native application data 202 across the cloud computing system 102. In one or more embodiments, the mesh identification manager 210 determines a topology of the cloud-native application across multiple device groups, regions, and/or across multiple cloud computing systems.

In addition to identifying application resources and an associated topology of the application data 202, the feature identification manager 204 additionally includes a quality of service (QoS) constraint manager 212 for identifying or otherwise determining quality of service (QoS) constraints. In particular, the quality of service (QoS) constraint manager 212 can identify operating constraints of a cloud-native application based on the application data 202 to determine various characteristics (e.g., non-functional characteristics) associated with operating, deploying, or otherwise implementing the cloud-native application described by the identified resources and mesh connections identified be the feature identification manager 204. As indicated above, examples of quality of service (QoS) constraints include operating constraints such as requiring that a resource have a threshold availability of service, allowing a maximum cost for accessing a service, a load balance requirement, a requirement that two different resources be deployed on different server devices, or any other operating constraint associated with deployment or implementation of the cloud-native application.

In one or more implementations, the quality of service (QoS) constraints identified by the quality of service (QoS) constraint manager 212 may affect identification of resources and/or mesh connections. For example, where a quality of service (QoS) constraint requires that two or more resources be connected via a server device or be deployed on different server devices, the resource identification manager 208 and/or mesh identification manager 210 may determine resources and/or mesh connections in accordance with the quality of service (QoS) constraint(s). Accordingly, in one or more embodiments, the quality of service (QoS) constraint manager 212 identifies quality of service (QoS) prior to the feature identification manager 204 identifying other types of application features. Alternatively, in one or more embodiments, the feature identification manager 204 modifies one or more identified resources and/or mesh connections in accordance with identified quality of service (QoS) constraints.

Upon identifying the application features, the feature identification manager 204 provides the identified application features to the model generator 206. The model generator 206 can then generate a platform-neutral application model 214 based on the identified application features. In particular, the model generator 206 can generate feature identifiers (e.g., resource identifiers, connection identifiers, etc.) including metadata, platform-generic feature descriptions, or any other information that may be used to identify resources, connections, or other services across different platforms for use when implementing a cloud-native application based on the platform-neutral application model 214.

For example, as shown in FIG. 2, the model generator 206 can generate a platform-neutral application model 214 including resource identifiers 216, mesh identifiers 218, and quality of service (QoS) identifiers 220 corresponding to the application features identified by the feature identification manager 204. Each of the identifiers 216-220 may include platform-neutral identifiers corresponding to respective resources, connections, and quality of service (QoS) constraints. In addition, the platform-neutral application model 214 may include any number of resource identifiers 216, mesh identifiers 218, and quality of service (QoS) identifiers 220 for providing a complete representation of application resources, mesh connectors, and quality of service (QoS) for a cloud-native application.

The platform-neutral application model 214 may be utilized in a number of ways in accordance with one or more example embodiments described herein. For example, the platform-neutral application model 214 may be used to generate a new application for a corresponding platform. In one or more embodiments, this may involve creating a new cloud-native application in accordance with the application features contained in the platform-neutral application model 214. For example, the application model generation system 106 may utilize an application or program configured to generate a platform-specific cloud-native application using the platform-neutral application model 214 as a template.

In one or more embodiments, the cloud computing system 102 includes resources configured to implement or deploy a projection of the platform-neutral application model 214 via a corresponding platform. For example, the cloud computing system 102 may have access to libraries, control planes, or other components capable of interpreting the platform-neutral application features in order to deploy a cloud-native application based on the resource identifiers 216, mesh identifiers 218, and/or quality of service (QoS) constraint identifiers 220 identified by the platform-neutral application model 214. In one or more embodiments, the cloud computing system 102 includes a deployment system or module (not shown) for translating the application features from the platform-neutral application model 214 and deploying a cloud-native application based on the application features identified within the platform-neutral application model.

Indeed, because each of the feature identifiers 216-220 refer to platform-neutral resources, mesh connections, and quality of service (QoS) constraints that can be applied across a number of different platforms, the cloud computing system 102 can utilize the platform-neutral application model 214 to deploy or otherwise implement a cloud-native application based on the platform-neutral application model 214. In this way, a developer need only generate the platform-neutral application model 214 to obtain an artifact that provides a complete description of a desired functionality across a number of different platforms.

Additional detail will now be provided in connection with an example embodiment in which the application model generation system 106 generates a platform-neutral application model based on application data obtained from an existing cloud-native application. For example, FIG. 3 illustrates an example series of acts 300 in which the application model generation system 106 generates a platform-neutral application model based on a set of translation rules applied to an existing cloud-native application.

As mentioned above, the series of acts 300 may be implemented by the application model generation system 106 implemented on one or multiple server device(s) 104 on the cloud computing system 102 to generate a platform-neutral application model. Alternatively, in some implementations, the series of acts 300 may be implemented as a modeling language applied to a platform-specific cloud-native application or manifest to generate the platform-neutral application model including similar characteristics as various examples described herein. Thus, the application model generation system 106 may be implemented in a variety of ways to enable ingesting an existing application file or manifest to generate the platform-neutral application model similar to examples described above.

Figure 3:
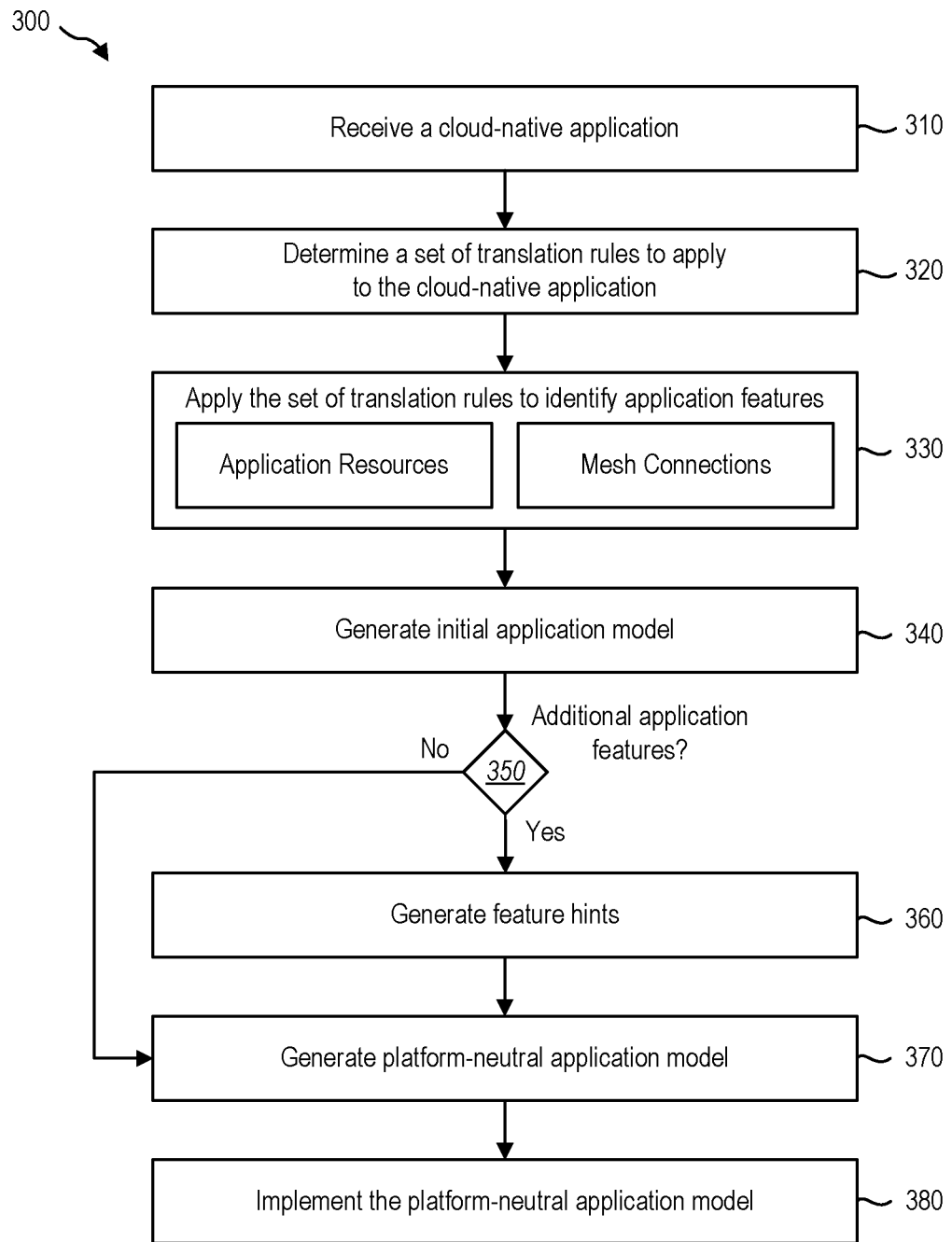
FIG. 3 illustrates an example process for applying a set of rules to a cloud-native application to identify application features and generate a platform-neutral application model in accordance with one or more implementations.

As illustrated in FIG. 3, the application model generation system 106 performs an act 310 of receiving a cloud-native application. The cloud-native application may refer to a previously developed platform-specific cloud-native application already implemented on the cloud computing system 102 (or other cloud-computing system).

As further shown, the application model generation system 106 can perform an act 320 of determining a set of translation rules to apply to the cloud-native application. As used herein, "translation rules" refer to code, algorithms, prediction models, machine learning models, or other model(s) that may be applied to application data (e.g., an application file, a portion of code of the cloud-native application) to interpret or otherwise translate the application data. As used herein, a "set of translation rules" may refer to a collection of rules associated with a particular platform. For example, a set of translation rules associated with a first platform may refer to translation rules that may be applied to a cloud-native application configured to be deployed or implemented via the first platform.

In one or more embodiments, the application model generation system 106 determines a set of translation rules corresponding to a platform of the platform-specific cloud-native application. For example, the application model generation system 106 can identify a set of translation rules from a plurality or collection of different sets of translation rules where each set of translation rules corresponds to a different platform. Accordingly, the application model generation system 106 can maintain a database, table, or other storage of different sets of translation rules and select one of the sets of translation rules based on an identified platform associated with the cloud-native application.

As shown in FIG. 3, the application model generation system 106 can perform an act 330 of applying the set of translation rules to identify application features. In particular, upon identifying a set of translation rules, the application model generation system 106 can apply the identified set of translation rules to the cloud-native application to extract or otherwise determine platform-neutral application features associated with implementing the cloud-native application across a number of different platforms. In accordance with one or more embodiments described above, the application model generation system 106 can identify resource identifiers and mesh identifiers corresponding to application resources and connections between resources to provide a platform-neutral representation of the functionality and topology for the cloud-native application.

Upon identifying the application resources and mesh connections (and corresponding identifiers), the application model generation system 106 can perform an act 340 of generating an initial application model. In particular, the application model generation system 106 may generate an initial application model including identifiers for all application resources and mesh connections identified by applying the set of translation rules to the cloud-native application.

The initial application model may include a representation of the cloud-native application including resource identifiers and mesh identifiers that the application model generation system 106 was able to determine based on the set of translation rules. In particular, the initial application model may include a full or partial representation of the cloud-native application depending. For example, the application model generation system 106 may be unable to identify one or more translation rules for functionalities and/or connections that are unique to the platform associated with the platform-specific application. Nevertheless, because the translation rules may be incomplete or fail to translate all resources and mesh connections, the initial application model may exclude one or more resource identifiers and/or mesh identifiers that provide a more complete representation of the functionality and topology of the cloud-native application.

Moreover, in one or more embodiments, the initial application model does not include any quality of service (QoS) identifiers. In particular, the translation rules may only include rules for identifying resources and connections, but fail to include any rules for identifying quality of service (QoS) constraints. Accordingly, the initial application model may similarly exclude one or more quality of service (QoS) that provide additional information regarding how a cloud-native application would be deployed or implemented across various platforms.

As shown in FIG. 3, the application model generation system 106 can perform an act 350 of determining whether additional application features exist. In particular, the application model generation system 106 can determine whether one or more additional application features exist that were not identified in generating the initial application model when the set of translation rules were applied to the cloud-native application. Where the application model generation system 106 determines that no additional application features exist (e.g., where the application model generation system 106 was able to identify all resources and/or mesh connections based on the set of translation rules), the application model generation system 106 can perform an act 370 of generating a platform-neutral application model in accordance with one or more embodiments described above. In the case that no additional application features exist (e.g., where applying the set of translation rules successfully identifies all application features), the functionality and topology of the platform-neutral application model may be fully represented by the initial application model.

Alternatively, where the application model generation system 106 determines that one or more additional application features for the cloud-native application exist (e.g., where the application model generation system 106 was unable to identify one or more resources and/or mesh connections using the set of translation rules), the application model generation system 106 can perform an act 360 of generating one or more feature hints. As used herein, a "feature hint" refers to a file or data object that includes information associated with a functionality of an application. For example, a feature hint may include a file including code or instructions associated with a discrete functionality implemented by a cloud-native application that is platform-specific or cannot be implemented in a similar fashion on a different platform.

As shown in FIG. 3, the application model generation system 106 can additionally perform an act 370 of generating a platform-neutral application model. Where the application model generation system 106 has generated one or more feature hints, the platform-neutral application model may include both identifiers for the platform-neutral features (e.g., application resources and mesh connections) identified within the initial application model in addition to the feature hints. The platform-neutral application model may include any number of resource identifiers and mesh identifiers in addition to one or more files associated with the feature hints corresponding to functionalities of the cloud-native application that do not necessarily translate to one or more different platforms.

As further shown, the application model generation system 106 can perform an act 380 of implementing the platform-neutral application model. Similar to one or more embodiments described above, this may involve deploying or otherwise implementing a cloud-native application projected from or otherwise based on the platform-neutral application model via a target platform. For example, where the platform neutral application model includes application features that provide a complete representation of functionality and topology of the cloud-native application, the application model generation system 106 can implement the application model across a variety of platforms.

Alternatively, the application model generation system 106 can implement the platform-neutral application model by providing the platform-neutral application model including the identifier features and feature hints to a developer or other user for further development. For example, the application model generation system 106 can provide a file of the platform-neutral application model to a developer who can then translate the feature hints to similar or equivalent application features for a target platform or to a platform-neutral application feature applicable across a variety of target platforms. In one or more embodiments, the developer can add quality of service (QoS) constraints or other application features to the platform-neutral application model, thus providing additional information to facilitate efficient implementation of a cloud-native application based on the platform-neutral application model.

As another example, the application model generation system 106 can generate an application template for a cloud-native application associated with a specific platform (e.g., a different platform than the platform-specific application that was used in generating the platform-neutral application model). For instance, the application model generation system 106 can provide a translated cloud-native application in accordance with the target platform that enables a developer to add code or instructions to accomplish a desired function of the cloud-native application on the target platform. For example, a developer can further develop the cloud-native application based on the hint files included within the platform-neutral application model. In one or more embodiments, the developer can further add additional features not included in the original cloud-native application that was used in generating the platform-neutral application model.

Figure 4:
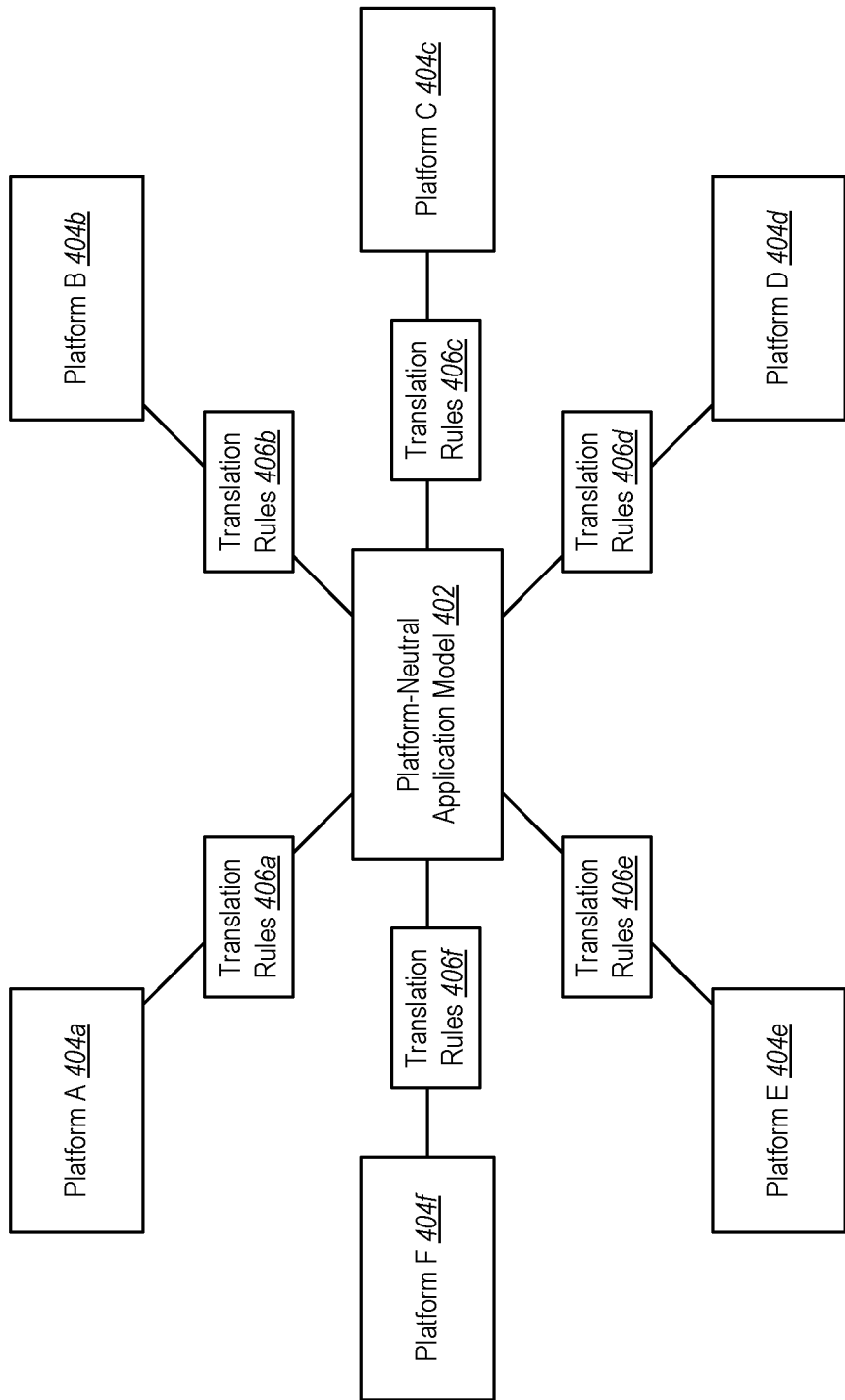
FIG. 4 illustrates an example implementation in which a platform-neutral application model may be used to translate a cloud-native application from one platform to another platform.

FIG. 4 illustrates an example implementation in which an application model generation system 106 can translate a cloud-native application associated with one platform to comply with another platform from any number of platforms. For example, as shown in FIG. 4, the application model generation system 106 can translate a platform-specific cloud-native application between any of six example platforms A-F 404a-f via a platform-neutral application model 402 generated in accordance with one or more embodiments described above. As further shown, each of the example platforms A-F 404a-f include corresponding translation rules 406a-f, which may vary (e.g., include different sets of translation rules) based on characteristics of the corresponding platforms A-F 404a-f.

Using the translation rules 406a-f, the application model generation system 106 can translate a platform-specific application from one platform to any other platform for which the application model generation system 106 has access to a corresponding set of translation rules. For example, the application model generation system 106 can generate the platform-neutral application model 402 for a cloud-native application corresponding to first platform (e.g., platform A 404a) by applying a first set of translation rules 406a associated with platform A 404a to the cloud-native application similar to the example implementation described above in connection with FIG. 3. In particular, the application model generation system 106 can apply the first set of translation rules 406a to the platform-specific cloud-native application to identify application resources and mesh connections and generate the platform-neutral application model including the identified application feature identifiers. The application model generation system 106 can additional generate and include one or more feature hints within the platform-neutral application model 402.

While one or more embodiments described above refer specifically to translation rules that enable the application model generation system 106 to translate a platform-specific cloud-native application to a platform-neutral application model, the application model generation system 106 can similarly identify a set of translation rules that facilitate transformation from the platform-neutral application model to a cloud-native application for a target platform.

In one or more embodiments, the application model generation system 106 identifies different sets of rules depending on whether the application model generation system 106 is generating a platform-neutral application model or, alternatively translating a platform-neutral application model to a platform-specific cloud-native application for a target platform. For example, while FIG. 4 illustrates a single set of translation rules 406a-f corresponding to each of the platforms A-F 404a-f, each of the illustrated sets of translation rules may include a select set (e.g., subset) of rules depending on whether the application model generation system 106 is translating a cloud-native application for a target platform or to the platform-neutral application model 402.

In translating between the various platforms, the application model generation system 106 may utilize an object model as an intermediate for all the transforms. For example, the application model generation system 106 may utilize an object model based on the following translation properties:

Chain Property: $f_{a \to b}(f_{b \to c}(x)) = f_{a \to c}(x)$

Inverse Property: $f_{a \to b}(f_{b \to a}(x)) = x$

Identity Property: $f_{a \to a}(x) = x$

By using an object model based on the above properties as an intermediate for the various transforms, the application model generation system 106 can generate the platform-neutral application model having a format that enables translation to any other format through the platform-neutral application model. For instance, where the object model (c) refers to an intermediate model for all transformations, a new manifest (e.g., object model) format (m) may be included by introducing two projections $f_{m \to c}$ and $f_{c \to m}$. The chain property indicated above ensures that any manifest format can be translated to any other format through the intermediate model.

In addition, in accordance with one or more embodiments described above, when transforming between incompatible models, the application model generation system 106 can generate feature hints (e.g., hints files), which are preserved within the platform-neutral application model by the inverse property. In particular, by adding the feature hints to the platform-neutral application model along the transformation chain, even where the feature hint is incompatible with one or more different platforms, the application model generation system 106 can ensure preservation of that platform-specific application feature in the case that the application model is later translated back to the original platform from which the feature hint originated.

While FIG. 4 illustrates an example in which six different platforms 404a-f are registered with the application model generation system 106 (and for which translation rules exist), the application model generation system 106 can additionally register any number of additional platforms and corresponding sets of translation rules. In addition, where conventional systems for translating between platforms traditionally involve implementing different translation rules for each potential translation between platforms (e.g., resulting in an exponentially increasing number of rules governing translation between an increasing number of platforms), the framework illustrated in FIG. 4 demonstrates that the application model generation system 106 can register a single set of translation rules for a corresponding platform that facilitates translation between that platform and any of the other platforms previously registered with the application model generation system 106. Accordingly, the application model generation system 106 can facilitate translation between any number of platforms by registering a single set of translation rules for each registered platform.

While FIGS. 3-4 describe an implementation in which the application model generation system 106 translates an application from one platform to another platform, the application model generation system 106 can alternatively generate the platform-neutral application model from the ground up. For example, rather than generating a platform-neutral application model by applying a set of translation rules to an existing or previously developed application, the application model generation system 106 can alternatively generate a platform-neutral application model based on instructions received from an application developer (e.g., as part of a process of developing a new application).

Figure 5:
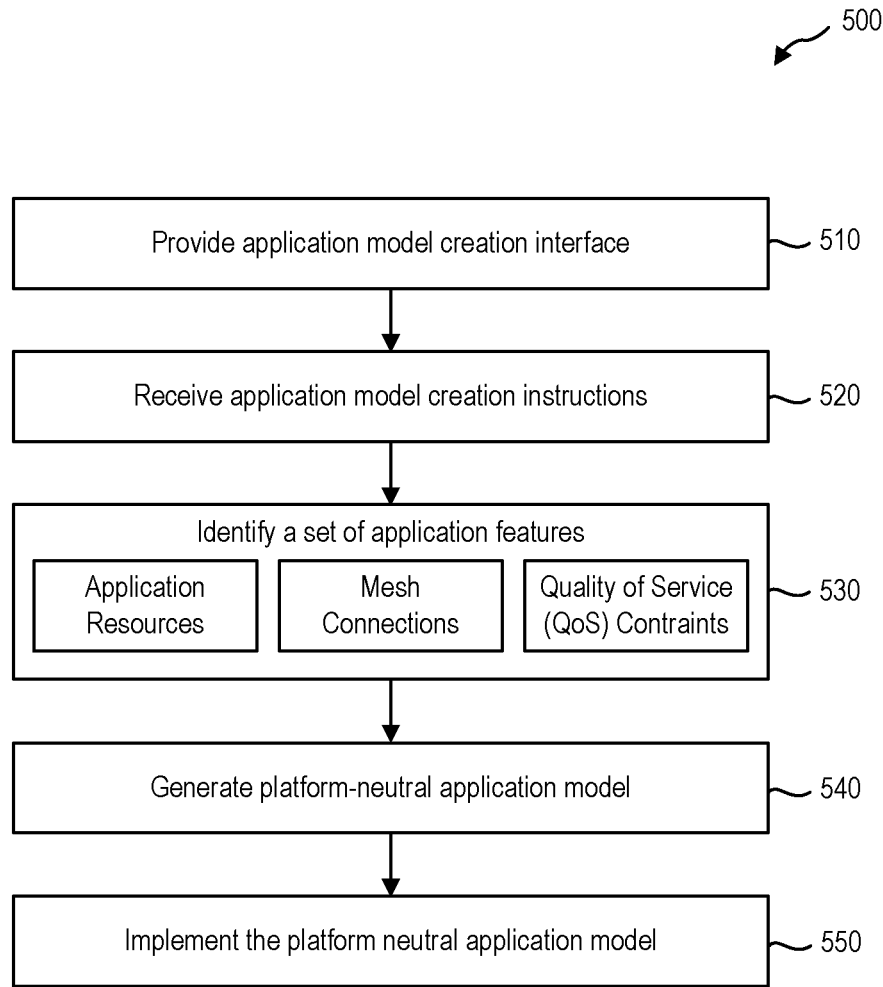
FIG. 5 illustrates an example process for creating a new platform-neutral application model in accordance with one or more implementations.

In particular, FIG. 5 illustrates an implementation in which the application model generation system 106 generates a platform-neutral application model based on instructions for creating a new cloud-native application (e.g., to be implemented on the cloud computing system 102). More specifically, FIG. 5 illustrates a series of acts 500 for generating a new platform-neutral application model.

As shown in FIG. 5, the application model generation system 106 can perform an act 510 of providing an application model creation interface. For example, the application model generation system 106 can provide an interface (e.g., a web interface) to a client device that enables a developer to interact with the interface and provide instructions for creating a cloud-native application. The application model generation system 106 may provide selectable options to indicate information associated with functionality, topology, and quality of service (QoS) metrics associated with implementing the cloud-native application on the cloud computing system 102.

Based on the inputs or information provided by the developer, the application model generation system 106 can perform an act 520 of receiving application model creation instructions. For example, the application model generation system 106 can receive preferences and application features selected or otherwise indicated by a developer that provide instructions of how to implement the cloud-native application on the cloud computing system 102 and/or one or more additional cloud-computing systems.

Based on the received instructions, the application model generation system 106 can perform an act 530 of identifying a set of application features (e.g., platform-neutral application features) corresponding to functionality, topology, and ways in which the functionality and topology are to be implemented on the cloud computing system 102. In particular, as shown in FIG. 5, the application model generation system 106 can identify application resources, mesh connectors, and quality of service (QoS) constraints that provide a complete representation of the functionality and topology of the new application.

As shown in FIG. 5, the application model generation system 106 may identify application features including a full representation of the functionality and topology for the new application. For example, because the application model generation system 106 receives instructions specifically tailored for designing a platform-neutral application model, the identified application resources, mesh connectors, and quality of service (QoS) constraints provide an accurate and full description of the new application.

Based on the identified application features, the application model generation system 106 can perform an act 540 of generating a platform-neutral application model. The platform-neutral application model can include resource identifiers, mesh identifiers, and quality of service (QoS) constraint identifiers, similar to one or more embodiments described above (e.g., in connection with FIG. 2). In addition, the application model generation system 106 facilitates conveniently adding information corresponding to new resources, mesh connections, and quality of service (QoS) constraints (e.g., based on additionally received instructions from a developer).

As further shown, the application model generation system 106 can perform an act 550 of implementing the platform-neutral application model. For example, the application model generation system 106 can deploy or otherwise implement a new application based on the platform-neutral application model. The application model generation system 106 can implement the application model in a variety of ways similar to one or more embodiments described above (e.g., in connection with FIG. 3).

Figure 6:
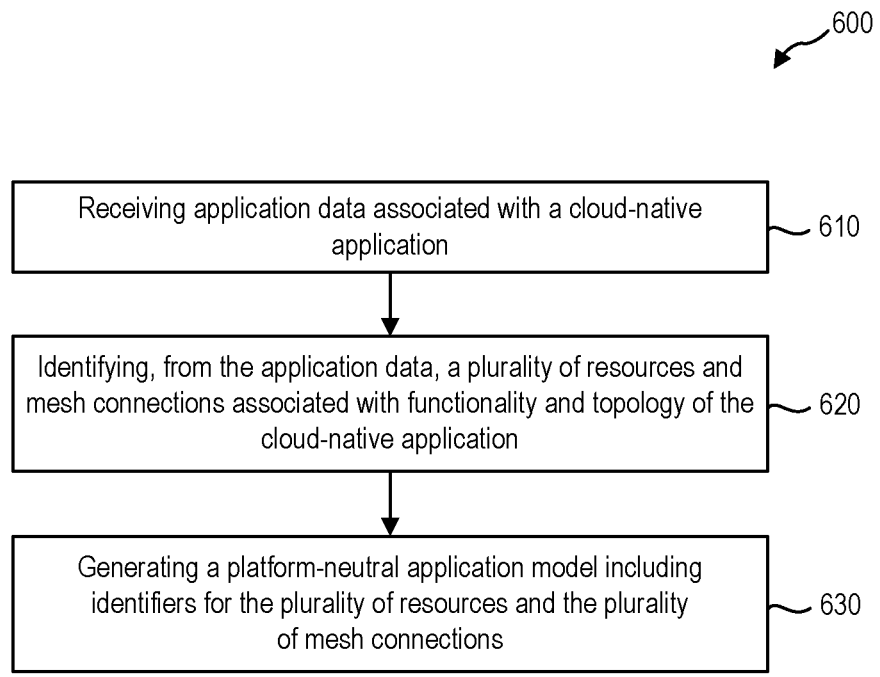
FIG. 6 illustrates an example of a method for generating a platform-neutral application model in accordance with one or more implementations.

Turning now to FIG. 6, these figures illustrate example flowcharts including series of acts for generating and implementing a platform-neutral application model. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a server device to perform the acts of FIG. 6. In still further embodiments, a system can perform the acts of FIG. 6.

For example, FIG. 6 illustrates a series of acts 600 that involve generating a platform-neutral application model in accordance with one or more embodiments described herein. As shown in FIG. 6, the series of acts 600 includes an act 610 of receiving application data associated with a cloud-native application. Receiving the application data may include receiving an application file including the cloud-native application where the cloud-native application includes a platform-specific cloud-native application. In one or more embodiments, receiving the application data includes receiving instructions for creating a new cloud-native application to be implemented on a cloud-computing system.

The series of acts 600 further includes an act 620 of identifying, from the application data, a plurality of resources and mesh connections associated with functionality and topology of the cloud-native application. For example, the act 620 can include identifying, from the received application data, a set of application features associated with implementing the cloud-native application on a cloud computing system where the set of application features includes a plurality of resources associated with functionality of the cloud-native application and a plurality of mesh connections associated with a topology of the cloud-native application.

In one or more embodiments, identifying the set of application features associated with implementing the cloud-native application on the cloud computing system includes applying a set of translation rules to the platform-specific cloud-native application to extract, from the application file, the plurality of resources associated with functionality of the platform-specific cloud-native application and the plurality of mesh connections associated with the topology of the platform-specific cloud-native application.

The plurality of resources may include service entities hosted by or accessible to the cloud computing system that offer discrete services, wherein the service entities include one or more of microservices, proxy servers, data storage spaces, or edge devices. In addition, the plurality of mesh connections may include connections. The plurality of mesh connections may include connections between the plurality of resources. The mesh connections may further include one or more of direct connections between server devices of the cloud computing system, message queues, intermediate server devices, or connections to one or more edge devices.

The series of acts 600 further includes an act 630 of generating a platform-neutral application model including identifiers for the plurality of resources and plurality of mesh connections. For example, the act 630 can include generating a platform-neutral application model descriptive of the topology and functionality of the cloud-native application where the platform-neutral application model includes a plurality of resource identifiers associated with the plurality of resources and a plurality of mesh identifiers associated with the plurality of mesh connections.

In addition to identifying resources and mesh connections to include within the platform-neutral application model, the series of acts 600 can further include identifying the set of application features may further include identifying one or more operation constraints associated with quality of service (QoS) metrics for implementing the cloud-native application on the cloud computing system. The platform-neutral application model may further include one or more quality of service (QoS) identifiers associated with the one or more operation constraints. The quality of service (QoS) identifiers may include tags assigned to the platform-neutral application model (e.g., tags assigned to corresponding resource identifiers or mesh identifiers). The operating constraints may include one or more of a measure of availability of one or more resources of the plurality of resources, a measure of cost associated with a service provided by one or more resources of the plurality of resources, or a restriction associated with deploying one or more services of the cloud-native application on a common server device or grouping of multiple server devices.

In one or more embodiments, the series of acts 600 further includes identifying one or more additional features of the platform-specific cloud-native application that cannot be extracted using the set of translation rules. The series of acts 600 may further include based on the identified one or more additional features, generating one or more feature hints to associate with the platform-neutral cloud-native application. The series of acts 600 may further include generating an application template for the cloud-native application based on the platform-neutral application model, the application template comprising a partial representation of functionality and topology of the cloud-native application and the one or more feature hints.

As mentioned above, in one or more embodiments, the series of acts 600 includes receiving the application data by receiving an application file comprising a platform-specific cloud-native application. In addition, the series of acts 600 may include identifying the set of application features by identifying a first set of translation rules based on a first platform associated with the platform-specific cloud-native application and further applying the first set of translation rules to the platform-specific cloud-native application to extract the plurality of resources and the plurality of mesh connections.

Moreover, in one or more embodiments, the series of acts 600 includes identifying a second platform associated with a target platform on which a translated cloud-native application based on the platform-neutral application model is to be implemented. The series of acts 600 may further include identifying a second set of translation rules based on the second platform. The series of acts 600 may further include generating an application template for the translated cloud-native application associated with the second platform implementation via the second platform based on the platform-neutral application model.

Figure 7:
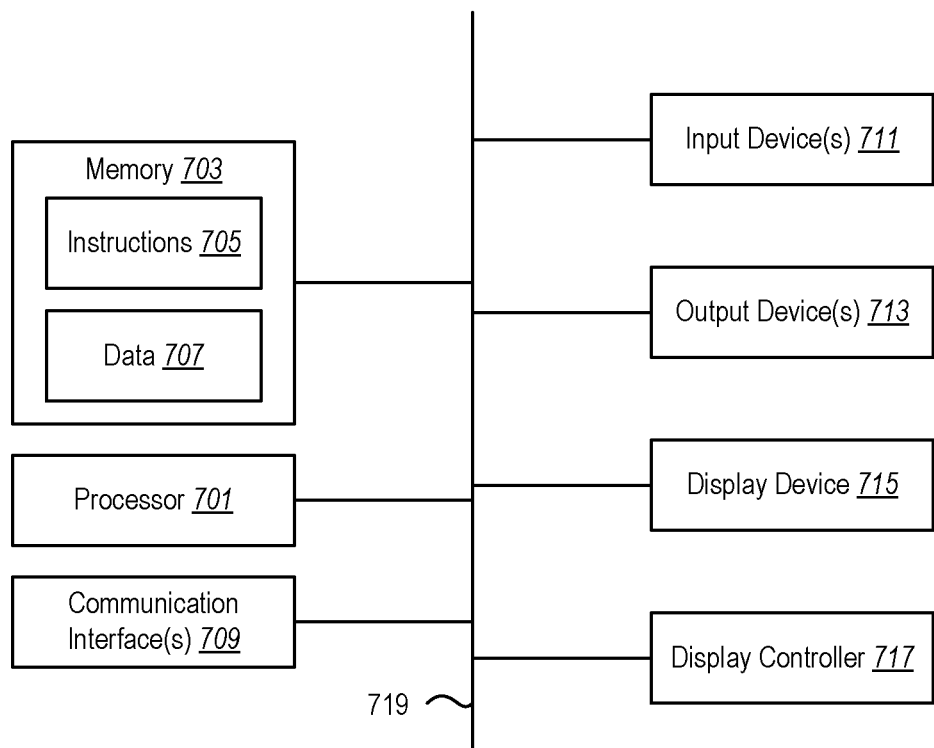
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   receiving application data associated with a cloud-native application;
   identifying, from the received application data, a set of application features associated with implementing the cloud-native application on a cloud computing system, the set of application features comprising a plurality of resources associated with functionality of the cloud-native application and a plurality of mesh connections associated with a topology of the cloud-native application; and
   generating a platform-neutral application model descriptive of the topology and functionality of the cloud-native application, the platform-neutral application model comprising a plurality of resource identifiers associated with the plurality of resources and a plurality of mesh identifiers associated with the plurality of mesh connections.

2. The method of claim 1, wherein identifying the set of application features further comprises identifying one or more operation constraints associated with quality of service (QoS) metrics for implementing the cloud-native application on the cloud computing system, and wherein the platform-neutral application model comprises one or more quality of service (QoS) identifiers associated with the one or more operation constraints.

3. The method of claim 2, wherein the one or more quality of service (QoS) identifiers are expressed as tags assigned to the platform-neutral application model, and wherein the one or more operation constraints associated with the one or more quality of service (QoS) identifiers comprise one or more of:
   a measure of availability of one or more resources of the plurality of resources;
   a measure of cost associated with a service provided by one or more resources of the plurality of resources; or
   a restriction associated with deploying one or more services of the cloud-native application on a common server device or grouping of multiple server devices.

4. The method of claim 1, wherein receiving the application data associated with the cloud-native application comprises receiving an application file comprising the cloud-native application, and wherein the cloud-native application comprises a platform-specific cloud-native application.

5. The method of claim 4, wherein identifying the set of application features associated with implementing the cloud-native application on the cloud computing system comprises applying a set of translation rules to the platform-specific cloud-native application to extract, from the application file, the plurality of resources associated with functionality of the platform-specific cloud-native application and the plurality of mesh connections associated with the topology of the platform-specific cloud-native application.

6. The method of claim 5, further comprising:
   identifying one or more additional features of the platform-specific cloud-native application that cannot be extracted using the set of translation rules; and
   based on the identified one or more additional features, generating one or more feature hints to associate with the platform-neutral application model.

7. The method of claim 6, further comprising generating an application template for the cloud-native application based on the platform-neutral application model, the application template comprising a partial representation of functionality and topology of the cloud-native application and the one or more feature hints.

8. The method of claim 1, wherein receiving the application data associated with the cloud-native application comprises receiving instructions for creating a new cloud-native application to be implemented on the cloud computing system.

9. The method of claim 1, wherein the plurality of resources includes service entities hosted by or accessible to the cloud computing system that offer discrete services, wherein the service entities include one or more of microservices, proxy servers, data storage spaces, or edge devices.

10. The method of claim 1, wherein the plurality of mesh connections include connections between the plurality of resources, and wherein the mesh connections include one or more of direct connections between server devices of the cloud computing system, message queues, intermediate server devices, or connections to one or more edge devices.

11. A system, comprising:
one or more processors;
memory in electronic communication with the one or more processors; and
instructions stored in the memory, the instructions being executable by the one or more processors to:
receive application data associated with a cloud-native application;
identify, from the received application data, a set of application features associated with implementing the cloud-native application on a cloud computing system, the set of application features comprising a plurality of resources associated with functionality of the cloud-native application and a plurality of mesh connections associated with a topology of the cloud-native application; and
generate a platform-neutral application model descriptive of the topology and functionality of the cloud-native application, the platform-neutral application model comprising a plurality of resource identifiers associated with the plurality of resources and a plurality of mesh identifiers associated with the plurality of mesh connections.

12. The system of claim 11, wherein identifying the set of application features further comprises identifying one or more operation constraints associated with quality of service (QoS) metrics for implementing the cloud-native application on the cloud computing system to include within the platform-neutral application model, wherein the one or more operation constraints comprise one or more of:
a measure of availability of one or more resources of the plurality of resources;
a measure of cost associated with a service provided by one or more resources of the plurality of resources; or
a restriction associated with deploying one or more services of the cloud-native application on a server device or grouping of multiple server devices.

13. The system of claim 11, wherein receiving the application data associated with the cloud-native application comprises receiving an application file comprising a platform-specific cloud-native application, and wherein identifying the set of application features comprises:
identifying a first set of translation rules based on a first platform associated with the platform-specific cloud-native application; and
applying the first set of translation rules to the platform-specific cloud-native application to extract the plurality of resources and the plurality of mesh connections.

14. The system of claim 13, further comprising instructions being executable by the one or more processors to:
identify a second platform associated with a target platform on which a translated cloud-native application based on the platform-neutral application model is to be implemented;
identify a second set of translation rules based on the second platform; and
generate an application template for the translated cloud-native application associated with the second platform based on the platform-neutral application model.

15. The system of claim 11, wherein receiving the application data associated with the cloud-native application comprises receiving instructions for creating a new cloud-native application to be implemented on the cloud computing system.

16. The system of claim 11,
wherein the plurality of resources includes service entities hosted by or accessible to the cloud computing system that offer discrete services, wherein the service entities include one or more of microservices, proxy servers, data storage spaces, or edge devices; and
wherein the plurality of mesh connections include connections between the plurality of resources, and wherein the mesh connections include one or more of direct connections between server devices of the cloud computing system, message queues, intermediate server devices, or connections to one or more edge devices.

17. A non-transitory computer-readable storage medium including instructions thereon that, when executed by at least one processor, cause a computing device to:
receive application data associated with a cloud-native application;
identify, from the received application data, a set of application features associated with implementing the cloud-native application on a cloud computing system, the set of application features comprising a plurality of resources associated with functionality of the cloud-native application and a plurality of mesh connections associated with a topology of the cloud-native application; and
generate a platform-neutral application model descriptive of the topology and functionality of the cloud-native application, the platform-neutral application model comprising a plurality of resource identifiers associated with the plurality of resources and a plurality of mesh identifiers associated with the plurality of mesh connections.

18. The non-transitory computer-readable storage medium of claim 17, wherein identifying the set of application features further comprises identifying one or more operation constraints associated with quality of service (QoS) metrics for implementing the cloud-native application on the cloud computing system to include within the platform-neutral application model, wherein the one or more operation constraints comprise one or more of:
a measure of availability of one or more resources of the plurality of resources;
a measure of cost associated with a service provided by one or more resources of the plurality of resources; or
a restriction associated with deploying one or more services of the cloud-native application on a server device or grouping of multiple server devices.

19. The non-transitory computer-readable storage medium of claim 17, wherein receiving the application data associated with the cloud-native application comprises receiving an application file comprising a platform-specific cloud-native application, and wherein identifying the set of application features comprises:
identifying a first set of translation rules based on a first platform associated with the platform-specific cloud-native application; and
applying the first set of translation rules to the platform-specific cloud-native application to extract the plurality of resources and the plurality of mesh connections.

20. The non-transitory computer-readable storage medium of claim 17, wherein receiving the application data associated with the cloud-native application comprises receiving instructions for creating a new cloud-native application to be implemented on the cloud computing system.

* * * * *